Figure 1:
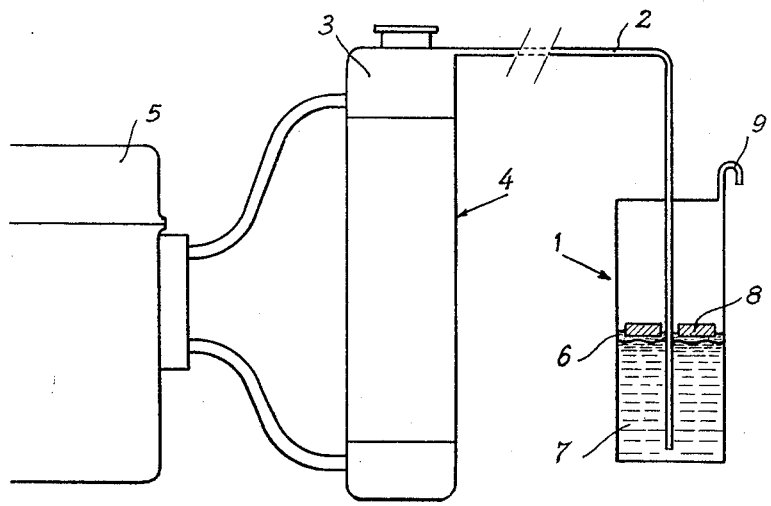

United States Patent Office 3,083,701
Patented Apr. 2, 1963

3,083,701
DEVICES FOR ENSURING THE FLUID-TIGHT-
NESS OF HYDRAULIC COOLING SYSTEMS OF
ENGINES
Lucien Péras, Billancourt, France, assignor to Regie
Nationale des Usines Renault, Billancourt, France
Filed Mar. 6, 1961, Ser. No. 93,783
Claims priority, application France July 2, 1960
1 Claim. (Cl. 123—41.54)

A known method of cooling an engine by causing a liquid to circulate in a fluid-tight circuit consists in causing the liquid expansion to be absorbed by an expansion vessel containing under constant-pressure or constant-volume conditions only air or air in the presense of liquids, this vessel being situated in an upper portion of the circuit (in general the upper water chest of the radiator). This arrangement is detrimental on the one hand because it allows the air in this vessel to contact the water issuing directly from the cylinderhead which is therefore at a relatively high temperature, and on the other hand because it occupies a considerable space between the radiator and the hood which, as a rule, are relatively close to each other. Now the increase in volume or pressure in a closed vessel containing air and a liquid at a temperature T depends on the following factors:

(1) Air compression resulting from the water expansion;
(2) Air compression resulting from its temperature increase;
(3) Vapor tension of the liquid at temperature T.

Similarly, the rate of evaporation in a vessel open to the atmosphere increases rapidly with the temperature of the cooling liquid.

It is the object of this invention to provide an improved arrangement wherein the air and liquid contained in this expansion vessel are located at any desired location in the circuit, whereby:

(a) The vessel can be placed with greater facility on the vehicle;
(b) A "cold point" can be selected at the same time in order to eliminate the causes (2) and (3) hereinabove of pressure increase (in the case of a closed vessel) or to reduce the risk of evaporation (in the case of an expansion vessel communicating freely with the atmosphere), so that in either case the risks of water leakage are eliminated or reduced.

According to a first embodiment, the expansion vessel is of the constant-pressure type and communicates with the free atmosphere, and the free surface of the liquid in this vessel, in order to avoid the evaporation of this liquid, is covered with a layer of a non-volatile liquid lighter than the cooling liquid, such as petrol, oil, octyle sebacate or di-ethyl-hexyl-sebacate.

This expansion vessel is connected to the uppermost point of the cooling system (for example the upper water chest of the radiator) through a pipe having its lower end opening located short of the bottom of said vessel. Thus, when the engine temperature rises, the overflowing liquid is discharged into the expansion vessel beneath the protection layer therein. When the engine cools down, the vacuum created by the liquid contraction causes the liquid to rise from the vessel to the radiator.

A float of adequate design, which covers at least partially the free surface of the liquid in the expansion vessel, prevents the abnormal stirring of the interface between the different liquids in order to preserve the liquid protection film.

A simple fluid-tight plug is provided for filling the vessel; thus, any safety valve may be dispensed with since the circuit remains constantly connected with the atmospheric pressure. To avoid any risk of boiling, the cooling liquid proper may consist of a mixture of water and high-boiling anti-freeze product.

Therefore, this device permits the free expansion of the cooling liquid and of any air trapped in the circuit while maintaining both fluids at the atmospheric pressure.

It is another advantage of this arrangement to permit the elimination of any air remaining in the circuit after the first filling thereof; of course, in this case a reserve of water must be provided in the expansion vessel and the latter must be dimensioned accordingly.

According to a modified embodiment of this invention the expansion vessel is of the constant-volume type; thus, it consists of a fully closed vessel; in this case it is not necessary to provide a protection film and a float, but a safety valve protects the circuit in case of abnormal accidental overpressure.

Thus, with either of these two forms of embodiment it is possible to place the expansion vessel at a level below the uppermost point of the circuit and notably in a cold location of the vehicle, for example behind the front grille or the wheel-receiving cavity or portion of the body, or in any other suitably ventilated location in close vicinity of the radiator.

Figure 2:
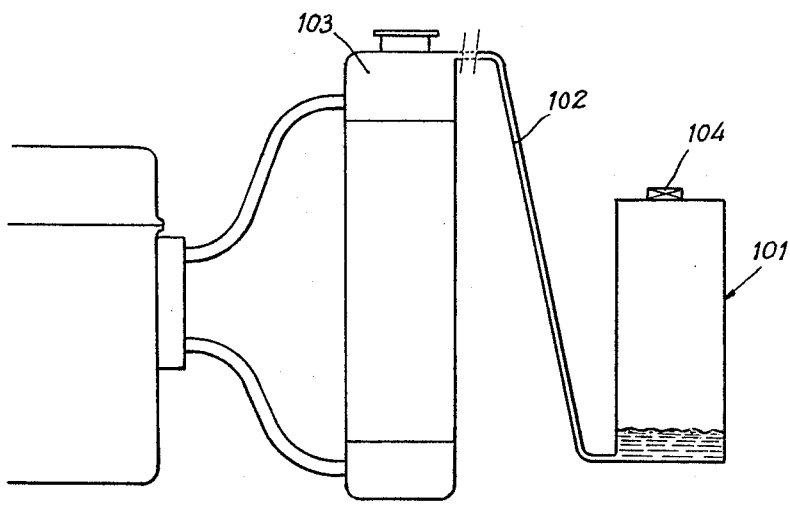

The invention will now be described with reference to the accompanying drawing illustrating diagrammatically by way of example the two forms of embodiment broadly set forth hereinabove. In the drawing:

FIGURE 1 is an elevational, half-sectional view showing the first form of embodiment of the invention, wherein the expansion vessel is at the atmospheric pressure, and FIGURE 2 illustrates the other aforesaid form of embodiment of the invention wherein the expansion vessel is of the constant-volume type.

As will be seen in FIG. 1, the device constituting the first form of embodiment of this invention comprises essentially an expansion vessel 1 connected through a pipe 2 to the upper water chest 3 of the radiator 4 connected in turn through the conventional pipes or hoses to the engine 5. The lower end opening of pipe 2 is located short of the bottom of the vessel 1.

In this vessel 1 communicating through a vent pipe 9 with the atmosphere a layer 6 of a non-volatile protecting liquid lighter than the cooling liquid (for example petroleum) overfloats, and prevents the evaporation of, the cooling liquid.

A float 8 prevents any abnormal stirring of the liquid surface covered by the protection layer.

Thus, when the engine temperature rises the excess liquid in the cooling circuit is forced into the expansion vessel and penetrates therein beneath the protection layer. As the engine cools down, the vacuum created by the liquid contraction draws the liquid from the vessel to the radiator.

According to the other form of embodiment illustrated in FIG. 2 the expansion vessel 101 containing air and liquid is closed completely. It is connected to the cooling circuit through a pipe 102 extending from the bottom of this vessel to an upper point of the cooling circuit, for example the upper water chest 103 of the radiator. A safety valve 104 protects the system from accidental overpressures.

When the temperature of the cooling liquid increases the level rises in the expansion vessel and the liquid compresses the air trapped therein above the liquid level. But whilst the temperature in the circuit is relatively high (say, 194° F.) it remains relatively low (nearly the room value) in the expansion vessel where the vapor tension is therefore moderate (.285 p.s.i. at 68° F. instead of 10 p.s.i. at 194° F). Thus, in comparison with other conventional devices the pressure is reduced considerably in the cooling circuit.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

In a hydraulic cooling circuit of an engine for a vehicle, means for ensuring the fluid tightness of the circuit and including an expansion vessel located at a cooled location of the vehicle and disposed at a level below the uppermost point of the circuit in communication with the circuit, said expansion vessel being at atmospheric pressure and a protective layer of a lighter, non-volatile liquid covering the free surface of the cooling liquid contained therein to prevent evaporation of the cooling liquid and a float disposed on the protective layer to prevent abnormal stirring of the liquid surface covered by the protective layer.

References Cited in the file of this patent

UNITED STATES PATENTS

| | | |
|---|---|---|
| 1,337,576 | Weeks | Apr. 20, 1920 |
| 1,378,070 | Welge | May 17, 1921 |
| 1,608,600 | Howe | Nov. 30, 1926 |
| 1,662,269 | Howe | Mar. 13, 1928 |
| 1,906,072 | Lumsden | Apr. 25, 1933 |